United States Patent [19]

Shinzawa

[11] Patent Number: 4,630,438
[45] Date of Patent: Dec. 23, 1986

[54] EXHAUST PARTICLE REMOVING SYSTEM FOR AN ENGINE

[75] Inventor: Motohiro Shinzawa, Yokosuka, Japan

[73] Assignee: Nissan Motor Company, Limited, Yokohama, Japan

[21] Appl. No.: 773,193

[22] Filed: Sep. 6, 1985

[30] Foreign Application Priority Data

Sep. 12, 1984 [JP] Japan .................. 59-189488

[51] Int. Cl.$^4$ .................................. F01N 3/02
[52] U.S. Cl. ........................ 60/274; 55/283; 55/DIG. 30; 60/286; 60/311
[58] Field of Search ............ 60/274, 286, 311; 55/283, 466, DIG. 30

[56] References Cited

U.S. PATENT DOCUMENTS 4,522,027  6/1985  Hasegawa .................. 60/274
4,567,725  2/1986  Shinzawa .................... 60/274

FOREIGN PATENT DOCUMENTS 59-7720  1/1984  Japan .
59-7721  1/1984  Japan .

Primary Examiner—Douglas Hart
Attorney, Agent, or Firm—Lowe, Price, LeBlanc, Becker & Shur

[57] ABSTRACT

A filter traps particles suspended in exhaust gas emitted from an engine. Degree of clogging of the filter is measured. It is indicated that the measured degree of clogging of the filter is equal to or greater than a first reference level. When the measured degree of clogging of the filter is equal to or greater than the first reference level and a manual switch is in an ON position, the particles deposited on the filter are burned off. When the measured degree of clogging of the filter is equal to or greater than a second reference level, the particles deposited on the filter are burned off independent of whether or not the manual switch is in the ON position. The second reference level is greater than the first reference level. It may be indicated that the particles deposited on the filter are being burned off.

5 Claims, 2 Drawing Figures

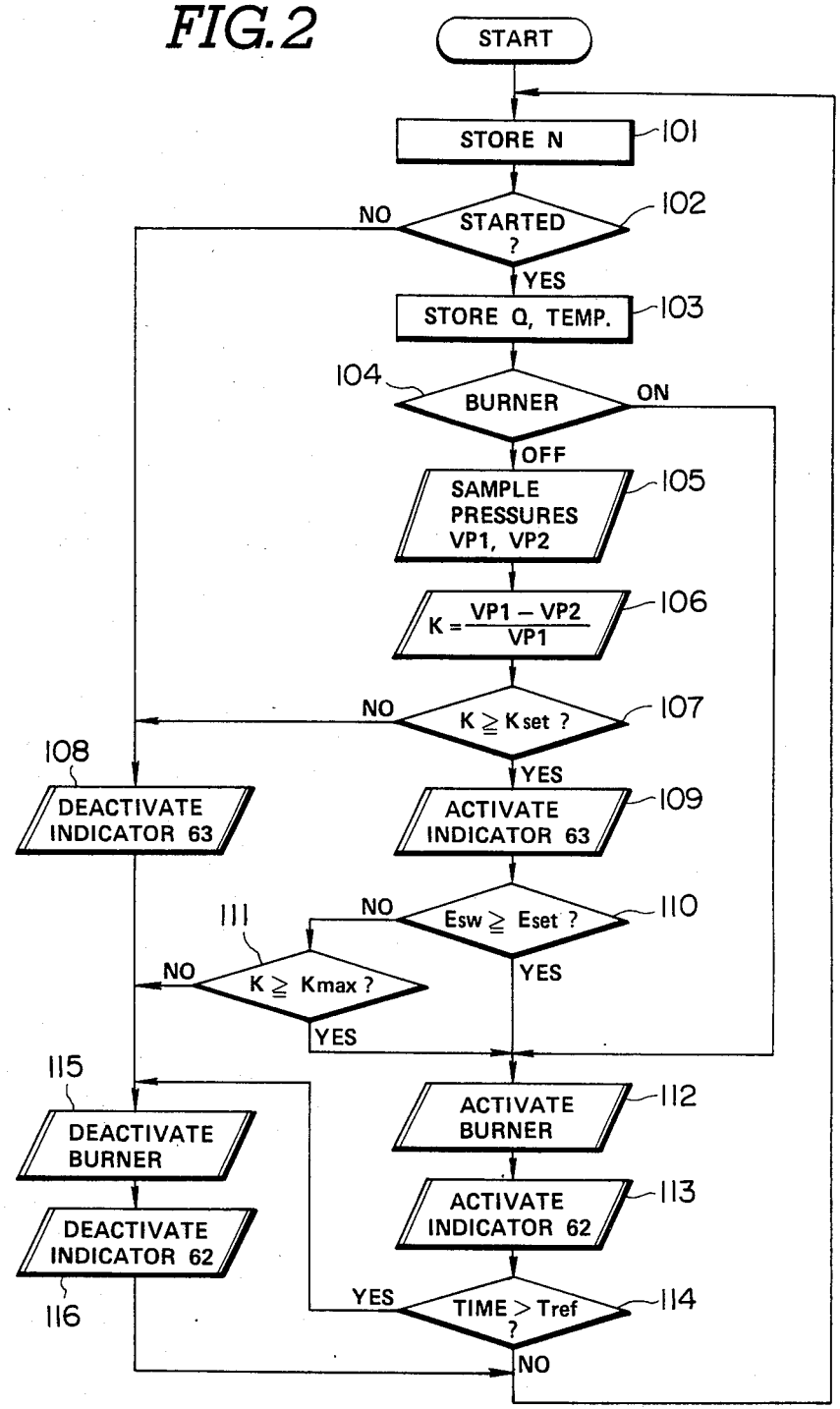

ically-powered fuel pump 33. This fuel may consist of the same petroleum fuel used to run the engine. When the fuel valve 30 is open, fuel is admitted into the mixture injection tube 28 via the mixture feed pipe 31 provided that the fuel pump 33 is activated. When the fuel valve 30 is

EXHAUST PARTICLE REMOVING SYSTEM FOR AN ENGINE

BACKGROUND OF THE INVENTION

1. Field of the Invention

This invention relates to a system for removing particles from exhaust produced by engines, such as diesel engines.

2. Description of the Prior Art

Exhaust produced by diesel engines has a relatively high content of polluting particles composed of carbon, unburned fuel, and partially burned fuel. Filters disposed in engine exhaust systems are conventionally used to remove the particles from the exhaust. In this case, burners positioned in the exhaust systems upstream of the filters are often employed to burn off the particles deposited on the filters in order to unclog and rejuvenate the filters.

Japanese Patent Publication No. 59-7721 discloses such a particle removing system. This system includes a detection circuit for determining the degree of clogging of the filter. This system also includes a manual switch. Provided that the manual switch is closed, the burner is activated when the degree of clogging of the filter reaches an unacceptable level. In cases where the manual switch is open, the burner keeps deactivated even when the degree of clogging of the filter becomes unaccepable. Accordingly, there is a possibility that the filter clogs unacceptably.

Japanese Patent Publication No. 59-7720 discloses an exhaust particle removing system for an internal combustion engine. In this system, the burner is activated when the engine is stopped, provided that the filter has unacceptably clogged. As the particles deposited on the filter burn, intense heat is generated. When the engine stops, engine exhaust decreases. This exhaust decrease prevents that intense heat from diffusing smoothly and quickly. Accordingly, the filter tends to be damaged by the excessive heat.

SUMMARY OF THE INVENTION

It is an object of this invention to provide a reliable exhaust particle removing system for an engine.

In accordance with this invention, a filter traps particles suspended in exhaust gas emitted from an engine. Degree of clogging of the filter is measured. It is indicated that the measured degree of clogging of the filter is equal to or greater than a first reference level. When the measured degree of clogging of the filter is equal to or greater than the first reference level and a manual switch is in a preset position, the particles deposited on the filter are burned off. When the measured degree of clogging of the filter is equal to or greater than a second reference level, the particles deposited on the filter are burned off independent of whether or not the manual switch is in the preset position. The second reference level is greater than the first reference level. It may be indicated that the particles deposited on the filter are being burned off.

BRIEF DESCRIPTION OF THE DRAWINGS

FIG. 2 is a flowchart of a program for operating the control unit of FIG. 1.

DESCRIPTION OF THE PREFERRED EMBODIMENT

Figure 1:
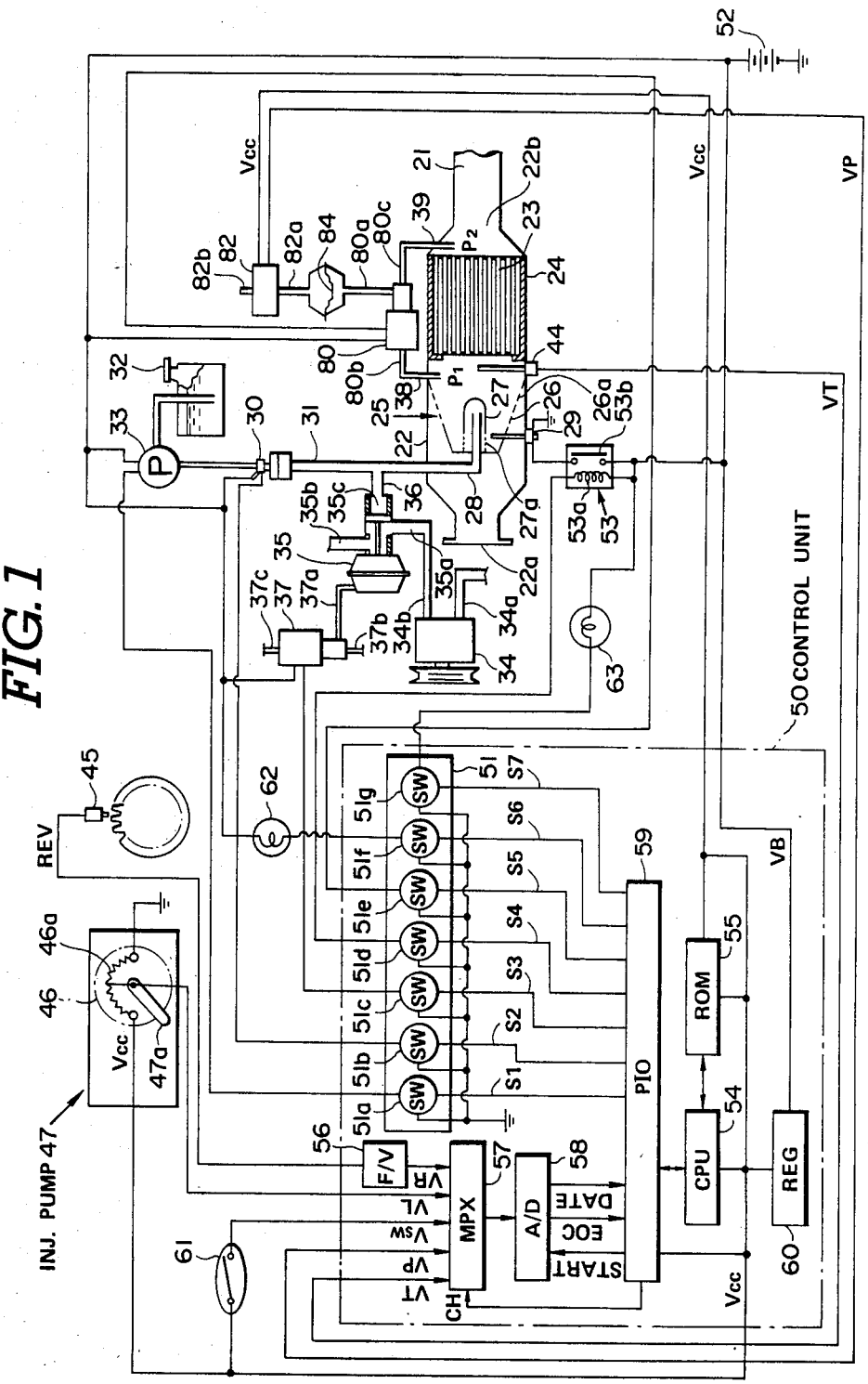
FIG. 1 is a diagram of an exhaust particle removing system for an engine according to this invention.

With reference to FIG. 1, an exhauhst passage 21 extending from a diesel engine (not shown) conducts exhaust gas from the engine. A casing 22 encloses a chamber. The casing 22 has an inlet 22a and an outlet 22b in communication with each other via the chamber. This casing 22 is disposed with respect to the exhaust passage 21 in such a way that the chamber in the casing 22 constitutes a part of the exhaust passage 21 and that exhaust gas enters the chamber via the inlet 22a and exits from the chamber via the outlet 22b.

A filter 23 of a honeycomb structure is disposed within the downstream half of the casing 22 to trap particles suspended in the exhaust gas. A buffer 24 is sandwiched between the filter 23 and the walls of the casing 22 so that the filter 23 is gently supported within the casing 22. This filter 23 has a plurality of parallel holes extending between the upstream and downstream ends of the filter 23. These holes are of two types. The holes of the first type have open upstream ends and closed downstream ends. The holes of the second type have closed upstream ends and open downstream ends. The first holes adjoin the second holes via porous walls of the filter 23 so that the exhaust gas first enters the first holes and then passes through the porous walls into the second holes before exiting via the second holes. As the exhaust gas passes through the porous walls, particles suspended in this gas are trapped by the walls.

A burner 25 disposed within the upstream half of the casing 22 serves to burn off the particles trapped by the filter 23. The burner 25 includes a cylindrical combustion liner 26, a mixture vaporizing tube 27, a mixture injection tube 28, and a glow plug 29. The combustion liner 26 defines a combuston chamber in a region immediately upstream of the filter 23. The combustion liner 26 has a plurality of apertures 26a which admit exhaust gas into the combustion chamber. After passing through the combustion chamber, the exhaust gas enters the filter 23. The mixture vaporizing tube 27 is disposed within the combustion liner 26. The mixture injection tube 28 extends through the walls of the liner 26 into the mixture vaporizing tube 27. The mixture injection tube 28 serves to discharge a mixture of air and fuel into the mixture vaporizing tube 27. The discharged mixture reverses its flow and then moves out of the mixture vaporizing tube 27 into the combustion chamber via an opening or openings 27a through the walls of the tube 27. The glow plug 29 projects into a section of the combustion chamber near the opening 27a to ignite the mixture entering the combustion chamber. After igniting, the mixture burns in the combustion chamber and thereby the particles trapped by the filter 23 are burned off of the filter 23. Furthermore, the combustion of the mixture heats the mixture vaporizing tube 27, thereby speeding evaporation of the fuel in the tube 27 and thus facilitating ignition of the subsequently supplied mixture.

An electromagnetic-type fuel supply control valve 30 has an outlet connected to the mixture injection tube 28 via a fuel feed pipe 31. Fuel is driven from a fuel tank 32 to an inlet of the fuel valve 30 by an electrically-powered fuel pump 33. This fuel may consist of the same petroleum fuel used to run the engine. When the fuel valve 30 is open, fuel is admitted into the mixture injection tube 28 via the mixture feed pipe 31 provided that the fuel pump 33 is activated. When the fuel valve 30 is closed, fuel supply is interrupted. Electrical energization and de-energization of the fuel valve 30 causes the fuel valve 30 to be opened and closed respectively.

An engine-driven air pump 34 has an inlet 34a and an outlet 34b. The inlet 34a leads to the open air via an air cleaner (not shown). The air pump 34 draws air via the inlet 34a and discharges it via the outlet 34b. A pressure-operated three-way valve 35 has a first port 35a, a second port 35b, a third port 35c, and a control chamber partially defined by a spring-loaded diaphragm. The first port 35a is connected to the air pump outlet 34b. The second port 35b leads to the open air via the air cleaner. The third port 35c is connected to the mixture injection tube 28 via an air feed pipe 36. When the control chamber is exposed to atmospheric pressure, the first port 35a is connected to the second port 35b and is disconnected from the third port 35c so that air driven by the air pump 34 is relieved via the valve 35 and thus the mixture injection tube 28 does not receive any air. When the control chamber is exposed to a preset vacuum, the first port 35a is connected to the third port 35c and is disconnected from the second port 35b so that air driven by the air pump 34 enters the mixture injection tube 28 via the valve 35 and the air feed pipe 36.

Adjustment of the pressure in the control chamber of the valve 35 is realized via an electromagnetic three-way valve 37 having a first port 37a, a second port 37b, and a third port 37c. The first port 37a is connected to the control chamber of the valve 35. The second port 37b is connected to a vacuum source, such as an engine-driven vacuum pump. The third port 37c leads to the open air via the air cleaner. When the electromagnetic valve 37 is electrically de-energized, the first port 37a is connected to the third port 37c and is disconnected from the second port 37b, thereby exposing the control chamber of the valve 35 to atmospheric pressure and thus interrupting the air supply to the mixture injection tube 28. When the electromagnetic valve 37 is electrically energized, the first port 37a is connected to the second port 37b and is disconnected from the third port 37c, thereby exposing the control chamber of the valve 35 to the preset vacuum and thus enabling the air supply to the mixture injection tube 28.

A control unit 50 includes a switch section 51 having switches 51a, 51b, 51c, 51d, 51e, 51f, and 51g. Each of these switches 51a–51g includes a switching power transistor.

The fuel pump 33 is electrically connected across a battery 52 via the switch 51a. The fuel pump 33 is electrically energized and de-energized when the switch 51a is closed and opened respectively.

The fuel valve 30 is electrically connected across the battery 52 via the switch 51b. The fuel valve 30 is electrically energized and de-energized when the switch 51b is closed and opened respectively.

The air-supply-control electromagnetic valve 37 is electrically connected aross the battery 52 via the switch 51c. The electromagnetic valve 37 is electrically energized and de-energized when the switch 51c is closed and opened respectively.

A relay 53 has a control winding 53a and a switch 53b. Electrical energization and de-energization of the control winding 53a causes the switch 53b to be closed and opened respectively. The glow plug 29 is electrically connected across the battery 52 via the relay switch 53b. The glow plug 29 is electrically energized and de-energized when the relay switch 53b is closed and opened respectively. The relay winding 53a is electrically connected across the battery 52 via the switch 51d. The relay winding 53a is electrically energized and de-energized when the switch 51d is closed and opened respectively. Accordingly, closing and opening the switch 51d causes the glow plug 29 to be activated and deactivated respectively.

The switches 51a, 51b, 51c, and 51d have control terminals, to which electrical control signals S1, S2, S3, and S4 are applied respectively to control these switches.

When all of the switches 51a–51d are closed via the signals S1–S4, the fuel pump 33, the fuel valve 30, the air-supply-control electromagnetic valve 37, and the glow plug 29 are all electrically energized. As a result, fuel is driven by the fuel pump 33 into the mixture injection tube 28 via the fuel valve 30 and air is admitted from the air pump 34 into the mixture injection tube 28 via the air valve 35. A mixture of air and fuel thus results, which is discharged into the combustion chamber of the burner 25. The discharged mixture is ignited by the glow plug 29. Thus, in this case, the burner 25 is activated.

The fuel valve 30 may be energized intermittently at a constant frequency during operation of the burner 25. In this case, the rate of fuel supply to the burner 25 is determined by the duty cycle of current pulses flowing through the fuel valve 30.

When all of the switches 51a–51d are opened via the signals S1–S4, the fuel pump 33, the fuel valve 30, the air-supply-control electomagnetic valve 37, and the glow plug 29 are all electrically de-energized. As a result, the fuel valve 30 interrupts admission of fuel into the mixture injection tube 28 and the air valve 35 interrupts admission of air into the mixture injection tube 28, so that no air-fuel mixture is supplied to the burner 25. Thus, in this case, the burner 25 is deactivated.

An electromagnetic three-way valve 80 has three ports 80a, 80b, and 80c. When this valve 80 is electrically de-energized, the first port 80a is connected to the second port 80b and is disconnected from the third port 80c. When the valve 80 is electrically energized, the first port 80a is connected to the third port 80c and is disconnected from the second port 80b.

A first pressure introduction passage 38 connects the second port 80b of the three-way valve 80 to a point within the casing 22 immediately upstream of the filter 23 so that the second port 80b is exposed to the pressure at this point. This pressure will be referred to as the upstream pressure P1 hereinafter. A second pressure introduction passage 39 connects the third port 80c of the three-way valve 80 to a point within the casing 22 immediately downstream of the filter 23 so that the third port 80c is exposed to the pressure at this point. This pressure will be referred to as the downstream pressure P2 hereinafter.

A pressure sensor 82 has a sensing port 82a and a reference port 82b. This pressure sensor 82 monitors the pressure difference between its ports 82a and 82b. The sensing port 82a is connected to the first port 80a of the three-way valve 80. A diaphragm 84 is disposed in the connection between the sensing port 82a and the first valve port 80a to prevent the transmission of heat and moisture but allow the transmission of pressure between them. In this way, the sensing port 82a is exposed to the pressure developed in the first valve port 80a. The reference port 82b leads to the open air via the air cleaner to be exposed to atmospheric pressure. The pressure sensor 82 is supplied with a constant voltage Vcc from a voltage regulator 60 described in more detail hereinafter. The pressure sensor 82 outputs a voltage signal VP which represents the pressure difference between its ports 82a and 82b.

The pressure sensor 82 may have a piezoelectric element and a gauge resistor provided on a silicon diaphragm whose opposing surfaces are subjected to the pressures in its ports 82a and 82b respectively. In this case, the effective resistance of the gauge resistor varies as a function of the difference in pressure between the ports 82a and 82b. The voltage regulator 60 disposed in the control unit 50 and connected to the battery 52 derives a constant voltage Vcc from the voltage VB actoss the battery 52. This constant voltage Vcc is applied across a series combination of a reference fixed resistor and the gauge resistor, so that the voltage across the gauge resistor or the voltage across the fixed resistor varies as a function of the resistance of the gauge resistor. Since the resistance of the gauge resistor depends on the pressure difference, the voltage across the gauge resistor or the voltage across the fixed resistor represents that pressure difference. This voltage is outputted by the sensor 41 as a pressure signal VP.

The three-way valve 80 is electrically connected across the battery 52 via the switch 51e in the control unit 50. The three-way valve 80 is electrically energized and de-energized when the switch 51e is closed and opened respectively. A control signal S5 applied to a control terminal of the switch 51e serves to change the operating positions of the switch 51e.

When the switch 51e is opened via the control signal S5, the three-way valve 80 is de-energized so that the first valve port 80a is connected to the second valve port 80b and is disconnected from the third valve port 80c. As a result, the upstream pressure P1 is applied to the sensor sensing port 82a so that the pressure sensor 82 measures this upstream pressure P1 with respect to atmospheric pressure. When the switch 51e is closed via the control signal S5, the three-way valve 80 is energized so that the first valve port 80a is connected to the third valve port 80c and is disconnected from the second valve port 80b. As a result, the downstream pressure P2 is applied to the sensor sensing port 82a so that the pressure sensor 82 measures this downstream pressure P2 with respect to atmospheric pressure.

It should be noted that a combination of a normally-open electromagnetic valve and a normally-closed electromagnetic valve may be used in place of the three-way valve 80.

A first indicator 62, such as a bulb, is electrically connected across the battery 52 via the switch 51f in the control unit 50. When the switch 51f is closed and opened, the indicator 62 is electrically activated and deactivated respectively. A control signal S6 applied to a control terminal of the switch 51f serves to change the operating positions of the switch 51f.

A second indicator 63, such as a bulb, is electrically connected across the battery 52 via the switch 51g in the control unit 50. When the switch 51g is closed and opened, the indicator 63 is electrically activated and deactivated respectively. A control signal S7 applied to a control terminal of the switch 51g serves to change the operating positions of the switch 51g.

A temperature sensor 44 is disposed within the casing 22 at a point directly upstream of the center of the end face of the filter 23 but downstream of the burner 25. The temperature sensor 44 outputs a voltage VT representing the temperaure at that point which is substantially equal to the temperature at the outlet of the burner 25. The temperature sensor may include a thermocouple.

An engine speed sensor 45 monitors the rotational speed of the engine. This speed sensor 45 includes a crank angle sensor generating pulses corresponding to evenly spaced angular positions of the engine crankshaft. The frequency of these pulses is thus proportional to the engine speed. The speed sensor 45 outputs the resulting pulse signal Rev, the frequency of which indicates the engine speed. A frequency-to-voltage (F/V) converter 56 in the control unit 50 is connected to the engine speed sensor 45 to receive the pulse signal Rev. This circuit 56 converts the pulse signal Rev to a voltage VR which varies as a function of the engine speed.

An engine load sensor 46 monitors the load on the engine. This load sensor 46 includes a potentiometer 46a, the adjustment shaft of which is linked to the control lever 47a of a fuel injection pump 47. The angular position of the control lever 47a determines the rate of fuel injection into the engine. This control lever 47a is connected to an accelerator (not shown) so that the angular position of the control lever 47a reflects the power output required of the engine, that is, the load on the engine. The constant voltage Vcc outputted by the voltage regulator 60 is applied across the resistor of the potentiometer 46a, so that the potentiometer 46a outputs a voltage VL which varies as a function of the engine load.

A manual switch 61 is electrically connected in series with the voltage regulator 60 to receive the constant voltage Vcc. The switch 61 outputs a voltage Vsw representing its operating position. When the switch 61 is closed or on, the voltage Vsw is equal to the constant voltage Vcc. When the switch 61 is open or off, the voltage Vsw is essentially zero. In the case of a vehicular engine, the manual switch 61 is disposed in a vehicle passenger compartment so that a vehicle driver can operate the switch 61.

The control unit 50 includes a digital central processing unit (CPU) 54, a read-only memory (ROM) 55, a multiplexer (MPX) 57, an analog-to-digital (A/D) converter 58, and a peripheral input/output (PIO) circuit 59.

The multiplexer 57 is connected to the elements 44, 82, 61, 46, and 56 to receive the temperature signal VT, the pressure signal VP, the switch signal Vsw, the engine load signal VL, and the engine speed signal VR. The multiplexer 57 selects one of these signals in accordance with a channel selection signal CH issued by the PIO circuit 59 and passes it to the A/D converter 58. The selection signal CH has five different states corresponding to the five different selections. After receiving a start signal START from the PIO circuit 59, the A/D converter 58 commences converting the selected signal to a corresponding digital signal DATA. The A/D converter 58 outputs an end-of-conversion signal EOC to the PIO circuit 59 upon completion of the conversion, and then the digital signal DATA is transmitted to the PIO circuit 59.

The PIO circuit 59 outputs the control signals S1-S7 to the switches 51a-51g of the section 51 via connections between the circuit 59 and the switches 51a-51g.

The CPU 54 is connected to the PIO circuit 59 and the ROM 55 holding a program and fixed data. The CPU 54 has a clock generator and counters for measuring time intervals. The CPU 54 also has an internal random-access memory (RAM).

The CPU 54, the ROM 55, and the PIO circuit 59 are connected to the voltage regulator 60 so as to be powered by the constant voltage Vcc. It should be noted that the other circuits 51, 56, 57, and 58 are also powered by this constant voltage Vcc.

The control unit 50 operates in accordance with a program stored in the ROM 55. FIG. 2 is a flowchart of this program.

As shown in FIG. 2, in a first step 101, the current value of the engine speed derived from the engine speed signal VR is stored in the RAM of the CPU 54. In this program, the variable N represents the engine speed.

In a step 102 following the step 101, the CPU 54 determines whether or not the engine has started, and specifically determines whether or not the engine speed N exceeds a preset reference level Nref preferably chosen to be 500 rpm. In other words, the CPU 54 checks whether or not the engine is running. If the engine has started, that is, if the engine speed N exceeds the reference level Nref, the program advances to a step 103. If the engine has not yet started, that is, if the engine speed N does not exceed the reference level Nref, the program advances to a step 108.

In the step 108, the control signal S7 is adjusted to deactivate the indicator 63. As will be described hereinafter, the indicator 63 is activated when the degree of clogging of the filter 23 reaches an unacceptable level. After the step 108, the program advances to a step 115.

In the step 115, the burner 25 is deactivated. Specifically, the control signal S1 is adjusted to de-energizes the fuel pump 33. The control signal S2 is adjusted to close the fuel valve 30. The control signal S3 is adjusted to de-energize the electromagnetic valve 37, interrupting air supply to the burner 25.

In a step 116 following the step 115, the control signal S6 is adjusted to deactivate the indicator 62. As will be described hereinafter, the indicator 62 is activated when the burner 25 is activated. After the step 116, the program returns to the first step 101.

As long as the engine is at rest or has not yet started, the burner 25 and the indicators 62 and 63 remain deactivated by the steps 108, 115, 116.

In the step 103, the current value of the engine load derived from the engine load signal VL is stored in the RAM of the CPU 54. Also, the current value of the burner temperature derived from the temperature signal VT is stored in the RAM of the CPU 54. In this program, the variables Q and TEMP represent the engine load and the burner temperature respectively.

In a step 104 following the step 103, the CPU 54 determines whether or not the burner 25 is active on the basis of the engine load Q and the burner temperature TEMP derived in the preceding step 103. Specifically, the CPU 54 checks whether or not the burner temperature TEMP exceeds a reference level which depends on the engine load Q. If the burner 25 is inactive or off, the program advances to a step 105. If the burner 25 is active or on, the program advances to a step 112 by which activation of the burner 25 is maintained.

In the step 105, the current values of the upstream and downstream pressures P1 and P2 are sampled and stored in the RAM of the CPU 54. Specifically, the control signal S5 is adjusted to periodically energize and de-energize the three-way valve 80. The pressure values derived from the pressure signal VP are sampled and stored at moments preset intervals after energization and de-energization of the three-way valve 80. These sampled and stored values represent the upstream and downstream pressure P1 and P2. In this program, the variables VP1 and VP2 represent the upstream and downstream pressures respectively. The details of the step 105 is shown in U.S. patent application Ser. No. 706,795, by M. SHINZAWA, filed on Feb. 28. 1985, the disclosure of which is hereby incorporated by reference.

In a step 106 following the step 105, the CPU 54 determines the ratio of the upstream pressure value VP1 to the pressure difference value V$\Delta$P, where V$\Delta$P=(VP1−VP2). In this program, this ratio is represented by the variable K. Specifically, "K=(VP1−VP2)/VP1" is executed. It should be noted that (VP1−VP2)/VP1=1−(VP2/VP1).

Since exhaust gas generally exhibits laminar flow in the filter 23, the upstream pressure P1, the downstream pressure P2, and the pressure difference $\Delta$P across the filter 23 are all approximately proportional to the rate of exhaust gas flow through the filter 23 provided that the resistance of the filter 23, that is, the degree of clogging of the filter 23 is constant. The pressure differenCce $\Delta$P equals the upstream pressure P1 minus the downstream pressure P2. At a fixed degree of clogging of the filter 23, the ratio $\Delta$P/P1 thus remains at an approximately constant level independent of the rate of exhaust gas flow. As the degree of clogging of the filter 23 increases, the ratio $\Delta$P/P1 also increases. Accordingly, the ratio $\Delta$P/P1 represents the degree of clogging of the filter 23.

In a step 107 following the step 106, the CPU 54 compares the clogging value K given in the preceding step 106 with a first predetermined reference value Kset preferably representing a boundary between an acceptable range and an unacceptable range of clogging of the filter 23. If the clogging value K is smaller than the reference value Kset, that is, if the degree of clogging of the filter 23 is acceptable, the program advances to the step 108. Accordingly, as long as the degree of clogging of the filter 23 is acceptable, the steps 108, 115, and 116 reiterate periodically so that the burner 25, and the indicators 62 and 63 remain deactivated. If the clogging value K is equal to or greater than the reference value Kset, that is, if the clogging of the filter 23 is unacceptable, the program advances to a step 109.

In the step 109, the control signal S7 is adjusted to activate the indicator 63. In this way, when the clogging of the filter 23 becomes unacceptable, the indicator 63 is activated.

In a step 110 following the step 109, the current voltage value derived from the signal Vsw is stored in the RAM of the CPU 54. In this program, the variable Esw represents this voltage. Then, the CPU 54 compares the voltage value Esw with a predetermined reference value Eset to check the operating position of the manual switch 61. When the manual switch 61 is closed or is in an ON position, the voltage value Esw corresponds to the constant voltage Vcc, e.g., 5 volts. When the manual switch 61 is open or is in an OFF position, the voltage value Esw corresponds to zero. The reference value Eset is chosen to represent a voltage lower than the constant voltage Vcc but considerably higher than zero. In the case where the constant voltage Vcc is 5 volts, the reference voltage represented by the value Eset is preferably 4 volts. If the voltage value Esw is smaller than the reference value Eset, that is, if the manual switch 61 is open or is in the OFF position, the program advances to a step 111. If the voltage value Esw is equal to or greater than the reference value Eset, that is, if the manual switch 61 is closed or is in the ON position, the program advances to the step 112 by which the burner 25 is activated. Accordingly, when the clogging value K is equal to or greater than the reference value Kset and the manual switch 61 is closed, the burner 25 is is activated.

In the step 111, the CPU compares the clogging value K determined in the previous step 106 with a second predetermined reference value Kmax representing a degree of clogging of the filter 23 slightly greater than the degree of clogging of the filter represented by the first reference value Kset. If the clogging value K is smaller than the reference value Kmax, that is, the current degree of clogging of the filter 23 is smaller than the reference degree of clogging of the filter 23 represented by the value Kmax, the program advances to the step 115. Accordingly, as long as the degree of clogging of the filter 23 resides between the reference levels represented by the values Kset and Kmax and the manual switch 61 is open, the steps 115 and 116 reiterate periodically so that the burner 25 and the indicator 62 remain deactivated. It should be noted that, in this case, the indicator 63 is activated. If the clogging value K is equal to or greater than the reference value Kmax, that is, if the current degree of clogging of the filter 23 is equal to or greater than the reference degree of clogging of the filter 23 represented by the value Kmax, the program advances to the step 112.

In the step 112, the burner 25 is activated. Specifically, the control signal S1 is adjusted to energize the fuel pump 33. The control signal S2 is adjusted to open the fule valve 30. The control signal S3 is adjusted to energize the electromagnetic valve 37, supplying air to the burner 25. In addition, the rate of fuel supply to the burner 25 may be adjusted in accordance with the engine speed N, the engine load Q, and the burner temperature TEMP derived in the previous steps. The details of the step 112 is shown in U.S. patent application Ser. No. 706,795, by M. SHINZAWA, filed on Feb. 28, 1985, the disclosure of which is hereby incorporated by reference.

In a step 113 following the step 112, the control signal S6 is adjusted to activate the indicator 62. Accordingly, when the burner 25 is activated, the indicator 62 is activated. In this way, the indicator 62 represents activation of the burner 25.

In a step 114 following the step 113, the CPU 54 determines whether or not the time elapsed since the initiation of activation of the burner 25 exceeds a preset interval Tref. If this time elapsed does not exceeds the preset interval Tref, the program returns to the first step 101. Accordingly, the activation of the burner 25 is maintained for the reference interval Tref. This interval Tref is chosen so that the burner 25 can be unclogged reliably. If the time elapsed exceeds the preset interval Tref, the program advances to the step 115 by which the burner 25 is deactivated.

As a resut of cooperation of the steps 107 and 109, when the degree of clogging of the filter 23 reaches the first unacceptable level Kset, the indicator 63 is activated to signal a warning that urges the operator to take an action enabling activation of the burner 25, that is, to close the manual switch 61.

In cases where the degree of clogging of the filter 23 resides between the first and second unacceptable levels Kset and Kmax, as long as the manual switch 61 is open, the burner 25 and the indicator 62 remain deactivated by cooperation of the steps 110, 111, 115, and 116. In these cases, when the manual switch 61 is closed, the burner 25 and the indicator 62 are activated by cooperation of the steps 110, 112, and 113.

When the degree of clogging of the filter 23 reaches the second unacceptable level Kmax, the burner 25 and the indicator 62 are activated independent of the operating position of the manual switch 61 by cooperation of the steps 111, 112, and 113.

As the degree of clogging of the filter increases, heat generated when the exhaust particles trapped by the filter 23 burn increases. Excessive heat tends to damage the filter 23. The second reference level Kmax is chosen so that damage of the filter 23 can be prevented when the burner 25 is activated.

Whenever the burner 25 is activated, the engine is running. This is ensured by cooperation of the steps 102 and 112. When the engine is running, exhaust gas flows through the filter 23 at higher than a certain rate, restraining the filter 23 from heating up excessively.

As described previously, when the burner 25 is activated and deactivated, the indicator 62 is activated and deactivated respectively. Accordingly, the indicator 62 signals the operating conditions of the burner 25. When the indicator 62 signals the activation of the burner 25, the operator can be warned that the engine should not be stopped.

What is claimed is:

1. An exhaust particle removing system for an engine, comprising:
    (a) a filter disposed in an engine exhaust passage for trapping particles suspended in exhaust gas;
    (b) a burner for burning off the particles deposited on the filter;
    (c) means for measuring the degree of clogging of the filter;
    (d) means for deactivating the burner when the measured degree of clogging of the filter is lower than a first reference level;
    (e) means for indicating when the measured degree of clogging of the filter is equal to or greater than the first reference level;
    (f) a manual switch movable between an ON position and an OFF position;
    (g) means for activating the burner when the manual switch is in the ON position and when the measured degree of clogging of the filter resides between the first reference level and a second reference level greater than the first reference level;
    (h) means for deactivating the burner when the manual switch is in the OFF position and when the measured degree of clogging of the filter resides between the first reference level and the second reference level; and
    (i) means for activating the burner independent of the position of the manual switch when the measured degree of clogging of the filter is equal to or greater than the second reference level.

2. The system of claim 1, further comprising means for indicating when the burner is activated.

3. The system of claim 1, further comprising means for sensing rotational speed of the engine, and means for deactivating the burner independent of the degree of clogging of the filter when the sensed engine speed is lower than a reference speed.

4. A method comprising the steps of:
    (a) measuring degree of clogging of a filter which traps particles suspended in exhaust gas emitted from an engine;

(b) indicating when the measured degree of clogging of the filter is equal to or greater than a first reference level;

(c) burning off the particles deposited on the filter when the measured degree of clogging of the filter is equal to or greater than the first reference level and when a manual switch is in a preset position; and (d) burning off the particles deposited on the filter independent of whether or not the manual switch is in the preset position when the measured degree of clogging of the filter is equal to or greater than a second reference level greater than the first reference level.

5. The method of claim 4, further comprising the step of indicating when the particles deposited on the filter are being burned off.

* * * * *